(12) United States Patent
Horen et al.

(10) Patent No.: US 7,277,956 B2
(45) Date of Patent: Oct. 2, 2007

(54) SYSTEM AND METHOD FOR IMPROVED UTILIZATION OF BANDWIDTH IN A COMPUTER SYSTEM SERVING MULTIPLE USERS

(75) Inventors: Robert S. Horen, Pleasanton, CA (US); Sanjay Singal, Mountain View, CA (US)

(73) Assignee: Kasenna, Inc., Sunnyvale, CA (US)

( * ) Notice: Subject to any disclaimer, the term of this patent is extended or adjusted under 35 U.S.C. 154(b) by 512 days.

(21) Appl. No.: 09/916,655

(22) Filed: Jul. 27, 2001

(65) Prior Publication Data

US 2002/0049846 A1 Apr. 25, 2002

Related U.S. Application Data

(60) Provisional application No. 60/221,593, filed on Jul. 28, 2000.

(51) Int. Cl.
*G06F 15/16* (2006.01)
(52) U.S. Cl. .................. 709/231; 709/232; 709/233
(58) Field of Classification Search ........ 709/231–234, 709/226
See application file for complete search history.

(56) References Cited

U.S. PATENT DOCUMENTS

| | | | | | |
|---|---|---|---|---|---|
| 5,586,264 | A | * | 12/1996 | Belknap et al. ............. | 725/115 |
| 5,926,649 | A | * | 7/1999 | Ma et al. ....................... | 710/6 |
| 5,996,025 | A | * | 11/1999 | Day et al. ..................... | 719/328 |
| 6,014,694 | A | * | 1/2000 | Aharoni et al. ............. | 709/219 |
| 6,757,736 | B1 | * | 6/2004 | Hutchison et al. .......... | 709/232 |
| 2002/0038374 | A1 | * | 3/2002 | Gupta et al. ................ | 709/231 |
| 2002/0040403 | A1 | * | 4/2002 | Goldhor et al. ............. | 709/231 |
| 2002/0065925 | A1 | * | 5/2002 | Kenyon et al. ............. | 709/231 |
| 2003/0187811 | A1 | * | 10/2003 | Chang et al. ................. | 707/1 |

OTHER PUBLICATIONS

RealNetworks, "RealSystem 8.0x and earlier Production & Authoring Guides," http://service.real.com/help/library/earlier.html.*
RealNetworks, "RealServer Administration Guide," Dec. 13, 1999, http://service.real.com/help/library/guides/g270/realsrvr.htm, chapters 13 and 14.*
RealNetworks, "RealSystem G2 Production Guide," Mar. 22, 2000, http://service.real.com/help/library/guides/productiong27/realpgd.htm, chapters 3 and 7.*

* cited by examiner

*Primary Examiner*—Zarni Maung
*Assistant Examiner*—Nghi Tran
(74) *Attorney, Agent, or Firm*—Perkins Coie LLP (57) ABSTRACT

Method, computer program product and server computer system for use in a client server computer architecture. The server sends media assets over computer network to client computer and maintains file system organized into plurality of asset groups, each asset group comprising plurality of media assets, wherein media assets share storage medium bandwidth and storage space on server computer that is reserved for asset group to which plurality of media assets belong. An asset group placement policy module is provided that evaluates attributes of asset group to determine optimal placement of asset group within the file system of server computer system, avoiding replication of assets and spreading asset group across multiple file systems wherever possible. A media asset placement policy module is provided that evaluates asset bandwidth to determine optimal placement for asset and available resources and use this evaluation to distribute media assets within asset groups.

46 Claims, 6 Drawing Sheets

| COURSE | BIT RATE | 1(20) | 2(20) | 3(16) | 4(16) | 5(12) | 6(12) | 7(8) | 8(8) | 9(4) | 1(4) |
|---|---|---|---|---|---|---|---|---|---|---|---|
| CS101 | 1.5Mbps | 50 | 45 | 40 | 35 | 30 | 25 | 20 | 15 | 10 | 5 |
| CS101i | 200kbps | 50 | 45 | 40 | 35 | 30 | 25 | 20 | 15 | 10 | 5 |
| MA101 | 1.5Mbps | 50 | 45 | 40 | 35 | 30 | 25 | 20 | 15 | 10 | 5 |
| MA101i | 200kbps | 50 | 45 | 40 | 35 | 30 | 25 | 20 | 15 | 10 | 5 |
| CH101 | 1.5Mbps | 50 | 45 | 40 | 35 | 30 | 25 | 20 | 15 | 10 | 5 |
| CH101i | 200kbps | 50 | 45 | 40 | 35 | 30 | 25 | 20 | 15 | 10 | 5 |

SYSTEM AND METHOD FOR IMPROVED UTILIZATION OF BANDWIDTH IN A COMPUTER SYSTEM SERVING MULTIPLE USERS

RELATED APPLICATIONS

This application claims priority to now abandoned U.S. Provisional Patent Application Ser. No. 60/221,593, filed Jul. 28, 2000, with the United States Patent and Trademark Office, which is incorporated herein by reference.

FIELD OF THE INVENTION

The present invention relates broadly to distributed computer systems. More specifically, the present invention relates to organizing content into asset groups to optimize delivery to users in a distributed computer system.

BACKGROUND

Figure 1:
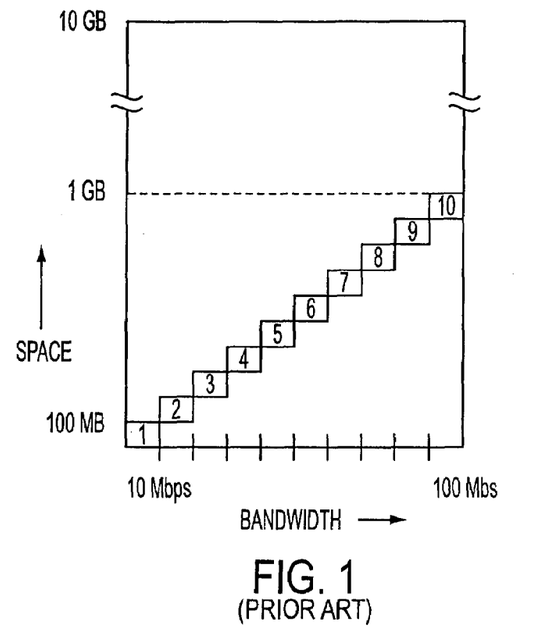
FIG. 1 is a diagram of utilization of bandwidth and storage space as used in prior art systems.

In a computer system serving media assets to multiple users, such as a server farm having significant mass storage in the form of magnetic and optical disks and providing content to users of client computers over a global computer network, a value indicating a guaranteed number of plays is an attribute associated with each media asset. This attribute is used to reserve storage bandwidth so that at any given time, a certain number of simultaneous playouts are available for the requested media asset. For file systems containing the media assets and as referred to herein, storage bandwidth refers to the transmission bandwidth available for transfer of media assets stored on the server computer over a communications medium, such as a network connection. For example, the storage bandwidth for one media asset doubles when it two media assets of the same size are played out simultaneously. A media asset can for example be audio, text, graphics, image, symbol, video, or other information item or token or communication item or method by which information such as audio or visual content is conveyed to a user. As referred to herein, "playout" refers to the streaming or other transfer of the media asset from a server computer to a client computer on which a user views or listens to the media asset. Additionally, the guaranteed number of plays attribute is used to determine the number of copies of the asset required to satisfy the guaranteed number of plays. However, there are limitations associated with utilization of this attribute. As shown in FIG. 1, a significant amount of storage space is wasted with respect to the storage bandwidth utilized for playouts of the ten media assets.

FIG. 1 illustrates utilization of storage space on a server versus storage bandwidth as utilized in conventional media asset delivery systems. In FIG. 1, a user desires a maximum of ten playouts from a set of ten 1 Mbps assets, each of which occupies ten MB of storage space. These playouts could all be from the same asset or from any combination thereof, although the total number of playouts is less than or equal to the ten playouts desired by the user. Typical implementations install each of these assets with ten guaranteed playouts. If these assets are all placed on a single file system with a bandwidth capacity of 100 Mbps and space capacity of 1 GB, then the entire file system bandwidth is consumed and the file system is no longer usable for further asset installations even though only 100 MB of disk space has been used. This is wasteful in terms of file system bandwidth and space.

SUMMARY

The present invention solves the problems discussed above by providing a method, computer program product and server computer system for use in a client server computer architecture. The server sends media assets over a computer network to a client computer and maintains a file system organized into a plurality of asset groups, each asset group comprising a plurality of media assets, wherein the media assets share storage medium bandwidth and storage space on the server computer that is reserved for the asset group to which the plurality of media assets belong.

Attributes are associated with each asset group, and can include a value indicating the number of maximum simultaneous playouts for the media assets within the asset group, and the maximum bit rate at which any single media asset within the asset group can be played out, the guaranteed possible number of playouts from each asset belonging to the asset group.

An asset group placement policy module is provided that evaluates the attributes of the asset group to determine optimal placement of the asset group within the file system of the server computer system, avoiding replication of assets and spreading the asset group across multiple file systems wherever possible.

A media asset placement policy module is provided that evaluates asset bandwidth to determine the optimal placement for the asset and available resources and use this evaluation to distribute the media assets within the asset groups.

By organizing media assets into asset groups of the present invention, resources such as storage bandwidth and storage space are conserved, thus allowing a server computer system to play a greater number of media assets to clients than conventional systems of similar storage capacity and storage bandwidth.

These and many other attendant advantages of the present invention will be understood upon reading the following detailed description in conjunction with the drawings.

DETAILED DESCRIPTION

Figure 2:
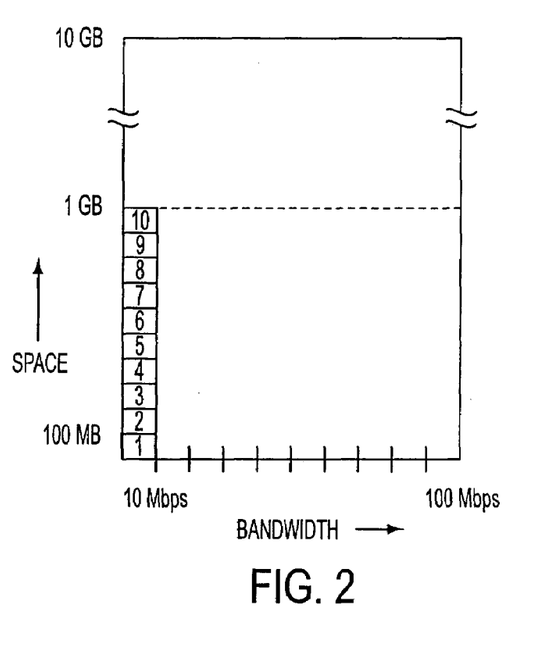
FIG. 2 is a diagram of utilization of bandwidth and storage space as used in accordance with an embodiment of the present invention.

Directing attention to FIG. 2, the present invention avoids the shortcomings of the problems discussed above and illustrated in FIG. 1 by organizing media assets into asset groups. As referred to herein, an asset group is a set of media assets (static image, video, audio, text, or combinations thereof) that can be played on a computer and which share a certain amount of system resources, such as storage space and storage bandwidth. FIG. 2 illustrates the manner in which asset groups can be used so that the storage bandwidth is more effectively used in comparison to the rapid growth or consumption of bandwidth on the conventional system and method of FIG. 1.

Figure 3:
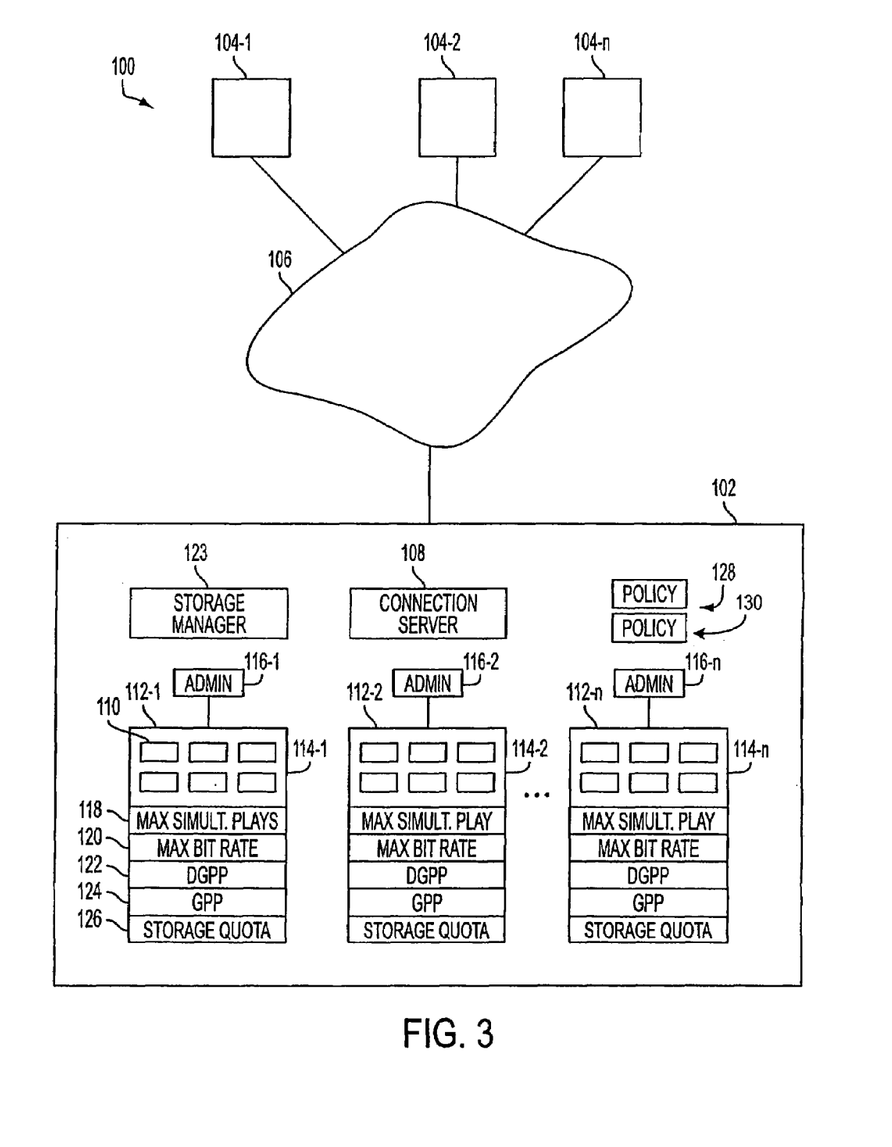
FIG. 3 is a block diagram illustrating an embodiment of the present invention as implemented in a client-server computer system implemented over a computer network.

Directing attention to FIG. 3, embodiments of the present invention utilize a client server computer architecture 100 having a server 102 connected or capable of being connected to one or more client computers 104-1, 104-2, ..., 104-n, where n is the number of consumers that utilize client computer 104 to receive content from server 102 via computer network 106. In the preferred embodiment, computer network 106 is a global computer network, such as the Internet, but may also be a wide area network, such as used within a company having multiple facilities located at different geographic sites, or smaller computer networks, such as computer networks used on college campuses, local area networks, and the like.

Server 102 incorporates connection server 108, a module that resides in memory and coordinates connections between the server 102 and clients 104. Once a connection is made, the server 102 then directs the distribution of media assets 110 in response to user requests for delivery. Media assets 110 can be stored in memory and/or mass storage devices, depending on user demand and storage requirements of the individual assets. The media assets 110 are organized within file systems 112 that are configured to store the assets in asset groups 114. An asset group 114 is normally administered by a single asset group administrator 116. In an embodiment of the present invention, each asset belongs to only one asset group, thus avoiding replication of assets and more efficiently using storage space and storage bandwidth. Asset group 114 can contain other asset groups as well as other assets, much as a file directory can contain files as well as subdirectories of files. Different assets within asset group 114 can have varied bit rates. The following attributes can be associated with asset group 114: Maximum Simultaneous Plays for Asset Group (118), Maximum bit rate (120), Default Guaranteed Possible Plays (DGPP) (122), Guaranteed Possible Playouts (124) (GPP), and Resource Quota (126). Each of these attributes are described in further detail immediately below.

Maximum Simultaneous Playouts for Asset Group (118) is an attribute that indicates the maximum simultaneous playouts possible from asset group 114. Sufficient file system bandwidth is reserved at asset group creation time in order to satisfy this value.

Maximum bit rate (120) is an attribute that describes the maximum bit rate of any single asset installed within asset group 114.

Default Guaranteed Possible Playouts (DGPP) (122) is an attribute that indicates the guaranteed number of playouts possible from each asset 110 within the asset group 114 assuming no other asset is being played out at the same time. Internally, the storage manager 123 will create enough copies of assets within asset group 114 at install time to satisfy the value designated by the DGPP 122. This value can be overridden for each asset 110.

Guaranteed Possible Playouts (124) (GPP): note that if A1, A2, ..., An are the assets within an asset group, GPP1, GPP2, ... GPPn are the GPP attributes for these assets respectively, and b1, b2, ... bn are the bit rates of the assets respectively, and BWAG is the bandwidth quota for asset group 114, then the following inequality holds:

$$GPPi * bi <= BWAG \text{ for } I=1,2, \ldots n.$$

Resource Quota (126) is an attribute that indicates the file system resources (storage space and storage bandwidth) reserved for asset group 114. All assets within asset group 114 share the storage bandwidth, and are not played out using any asset group's bandwidth. The bandwidth component of resource quota 126 is calculated by multiplying the value of the Maximum Simultaneous Playouts for Asset Group attribute 118 by the value of the Maximum Bit Rate attribute 120. Storage space computation is slightly more involved and depends on the maximum bit rate, duration of playing assets installed within asset group 114, the DGPP value for asset group 114 and also the availability of storage space and bandwidth on currently configured file system 112. The assets 110 installed within asset group 114 may not exceed the resource quota 126 in order to preserve the reservation of resources for each asset group.

With the introduction of asset groups, two levels of placement policies are implemented. Asset group placement policy module 128 performs asset group placement based on attributes which determine the resource quota 126 for the asset group 114, and media asset placement policy module 130 performs media asset placement within the placed asset group. In order to better utilize the resource quota, avoid fragmentation of disk resources and avoid asset replication where possible, asset groups are placed in a manner that avoid distributing the quota across multiple file systems as much as possible, such as on the same disk array or physical storage device, or within the group storage devices that make up a single file system. Policy module 130 evaluates asset bandwidth to determine the optimal placement for the asset and available resources and use this evaluation to distribute the media assets within the asset groups 114. Since storage space and storage bandwidth reservation have already been performed for the asset group 114 by policy module 128 prior to asset installation, policy module 130 restricts the placement domain of the media asset to the asset group distribution of storage space and storage bandwidth.

Figure 4:
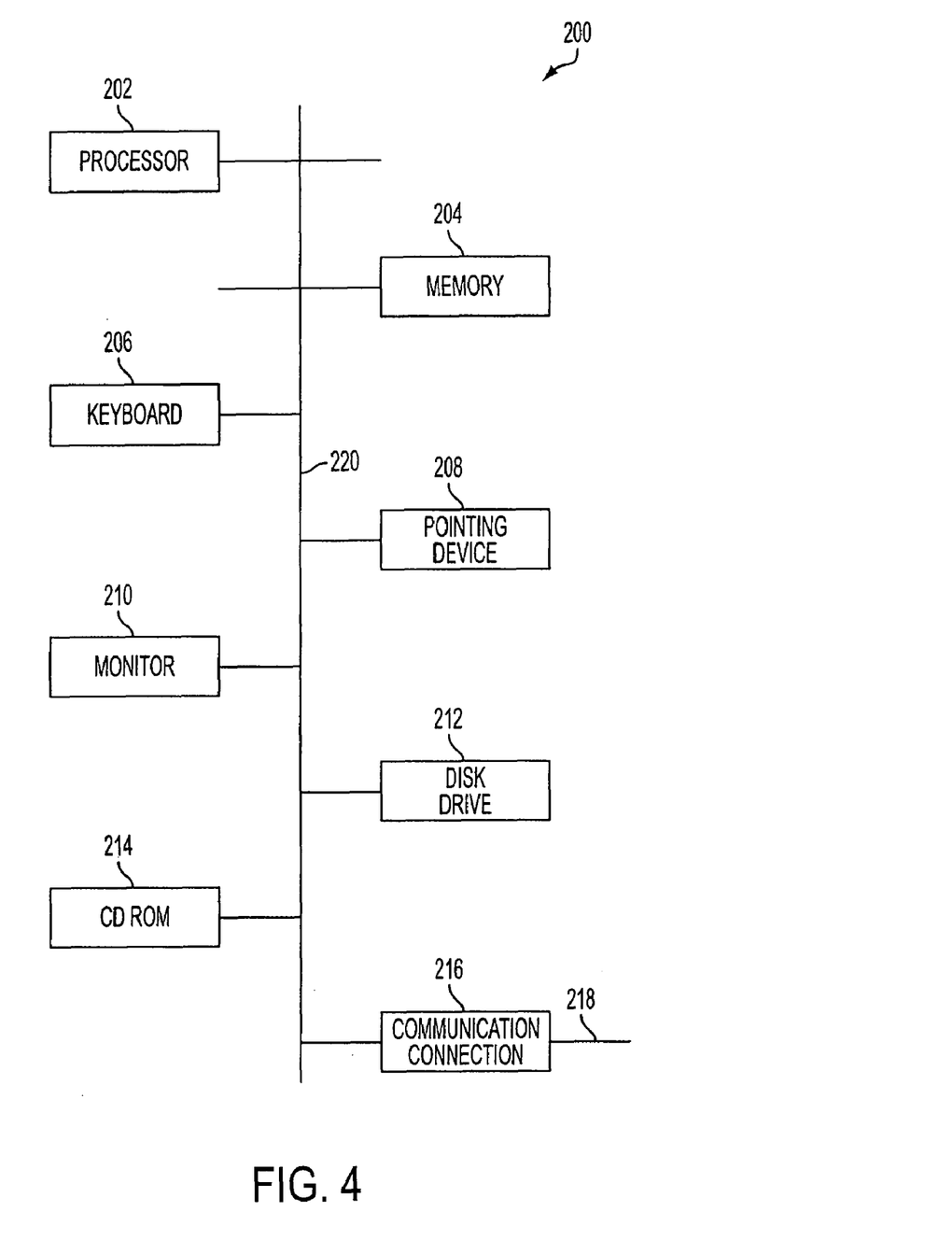
FIG. 4 is a block diagram illustrating the major components of a computer that may be used in connection with the client server system according to an embodiment of the invention.

FIG. 4 illustrates in block diagram form the major components included in a computer embodying either server 102 or client 104. Computer 200 incorporates a processor 202 utilizing a central processing unit (CPU) and supporting integrated circuitry. In the preferred embodiment, work stations such as Sun Ultra computers available from Sun Microsystems can be used as server 102. Personal computers such as available from Dell Corporation may be used for client computers 104. However, in general, any type of computer may be used for the server 102 and any type of computer may be used for client 104. Memory 204 may include RAM and NVRAM such as flash memory, to facilitate storage of software modules executed by processor 202, and file systems containing media assets. Also included in computer 200 are keyboard 206, pointing device 208, and monitor 210, which allow a user to interact with computer 200 during execution of software programs. Mass storage devices such as disk drive 212 and CD ROM 214 may also be in computer 200 to provide storage for computer programs, associated files, and media assets. In an embodiment, database products available from Oracle Corp. may be utilized in connection with file systems as a database and database server. Computer 200 communicates with other computers via communication connection 216 and communication line 218 to allow the computer 200 to be operated remotely, or utilize files stored at different locations. Communication connection 216 can be a modem, network interface card, or other device that enables a computer to communicate with other computers. Communication line 218 can be a telephone line or cable, or any medium capable of transferring data between computers. In alternative embodiments, communication connection 216 can be a wireless communication medium, thus eliminating the need for communication line 218. The components described above may be operatively connected by a communications bus 220.

Embodiments of the present invention are useful in a variety of applications where multiple media assets share a finite amount of bandwidth. Two scenarios where asset groups of the present invention provide improved file system resource utilization are described below. These examples are provided to illustrate the benefits of the present invention and are just two of many applications for which the present invention is suitable.

In an embodiment of the present invention, consider the situation of a news acquisition system as used by a major news provider such as CNN. Such a system provides asset playout access to a maximum of approximately 300 journalists. Assets are captured using a set of 40 encoders. Assets being captured (and stored in asset groups) comprise breaking news items. For illustrative purposes it is assumed that during a typical network load ten viewers access a given news item simultaneously. There can be multiple stories (up to 40 in this scenario, limited by the number of encoders) being captured at any given time. Additionally, there can be numerous old stories stored on the system.

According to one embodiment, an asset group is defined with the following attributes: (a) Maximum number of simultaneous playouts for asset group=300, (b) Maximum bit rate of assets installed=1.5 Mbps, (c) Default Guaranteed Possible Playouts=10. Given these attributes and values, the bandwidth component of the resource quota for the asset group is determined to be 450 Mbps. In the case of three available file systems: F1, having 300 Mbps of storage bandwidth and 60 GB of storage space; F2 having 150 Mbps of storage bandwidth and 30 GB of storage space; and F3, having 120 Mbps of storage bandwidth and 60 GB of storage space, an asset group can be created by the asset group placement policy 128 with the following distribution: ((F1, 250 Mbps, 50 GB), (F2, 100 Mbps, 20 GB), (F3, 100 Mbps, 50 GB)). Since the DGPP is 10, the maximum bit rate allowed for any single asset is 15 Mbps. This means that asset replication can be completely avoided. If the length of each news story is 90 minutes (which equates to about 1.0125 GB) this asset group can accommodate a total of about 175 hours of news stories or 117 news stories.

Contrast the embodiment of the present invention described immediately above with an implementation of a conventional system. If the media assets were installed individually on this system with guaranteed playouts=10, the total number of assets installed on the entire system could not have exceeded 570 Mbps, which is the combined bit rates for file systems F1, F2, and F3, divided by 15 Mbps, which is the maximum bit rate for any single asset. 570 Mbps divided by 15 Mbps yields 38 news stories. By forming an asset group, 117 news stories, nearly triple the amount of media assets allowed by conventional systems, may be accommodated using only a fraction of the file system resources.

Figure 5:
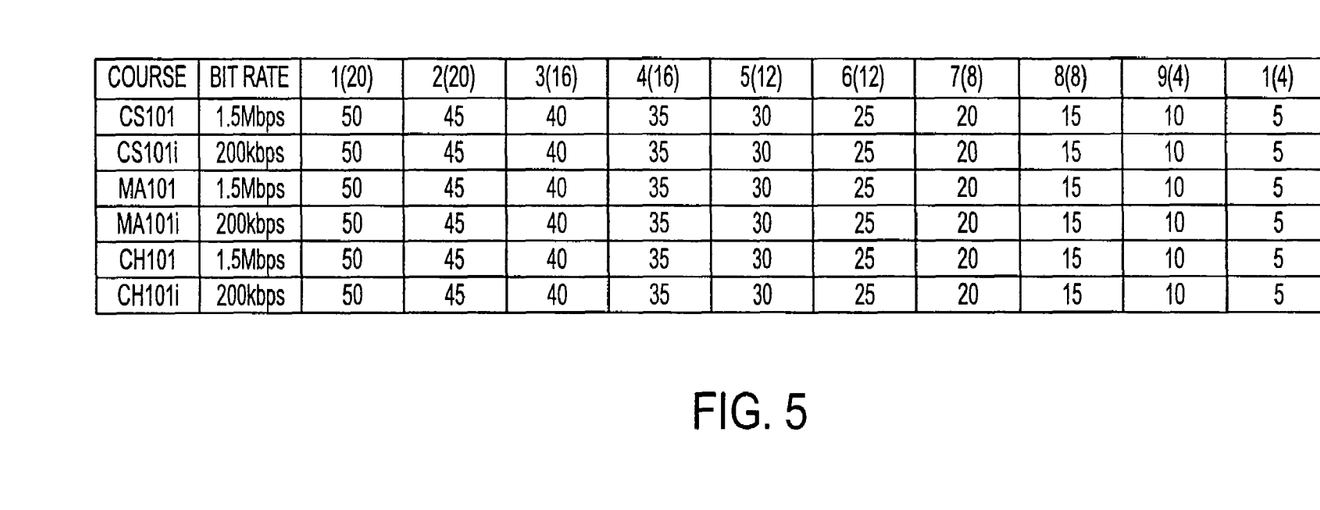
FIG. 5 is a table illustrating demand for media assets in a distance learning application according to an embodiment of the present invention.

In another embodiment of the present invention, consider the example of a university which would like to offer lecture notes for three courses to be viewed by two kinds of students: (a) students on campus who have access to the high-speed campus backbone and can view assets at 1.5 Mbps, and (b) students accessing the lecture notes over the Internet and thus limited to about 200 kbps. Further, the university provides lecture notes for the past ten weeks on a sliding window basis. Lecture notes for the current week are likely to be the most in demand, while those for the previous weeks are less in demand. The demand table to ten weeks is shown in the table in FIG. 5. The first column indicates the course name, the second the bit rate of assets available for that course (the "i" suffix for the course name indicates an Internet offering). The next ten columns indicate the maximum possible number of students who can access the course offerings for that particular week. For example, during the first week a maximum of fifty students can access the lecture notes for MA101, and during the seventh week a maximum of twenty students can access the lecture notes for CH101i. In addition, the number in parentheses "( )" next to the week number indicates the maximum number of simultaneous accesses for each individual lecture in the week. There are five sets of lecture notes stored for each week in each category. This example is ideal again for the illustration of the effectiveness of asset groups. The lecture notes administrator can create separate asset groups for the lecture notes of each course offering each week for each kind of bit rate. In this example, this means that there is a total of 60 asset groups, determined by each course having an asset group for the lecture notes for each week of the course. Half of these asset groups are assumed to have a maximum bit rate of 1.5 Mbps, the other half 200 kbps. The asset group for the lecture notes for the campus-access version of CS101 for week one would have the following attributes: (a) Maximum Simultaneous Playouts for Asset Group=50, (b) DGPP=20, and (c) Maximum Bit Rate for Assets Installed in Asset Group=1.5 Mbps. Let us further assume that each lecture is 60 minutes in duration.

System bandwidth and space requirements are now addressed. For this exemplary computation it is assumed that each lecture is 60 minutes in duration. Assuming no replication is needed (for simplicity, but not limiting the scope of the invention), the file system bandwidth and space requirement for this kind of a setup are as follows:

$$50*1.5 \text{ Mbps}*3 \text{ courses}+50*0.2 \text{ Mbps}*3 \text{ courses}=255 \text{ Mbps bandwidth, and}$$
$$(5*60*60*1.5 \text{ Mbps}*3 \text{ courses}+5*60*60*0.2 \text{ Mbps}*3 \text{ courses})/8=11.475 \text{ GB} \quad \text{Week 1:}$$

If on the other hand, asset groups were not used and individual assets were installed, the following would have been the resource requirements:

$$5*20*1.5*3+5*20*0.2*3=510 \text{ Mbps bandwidth.} \quad \text{Week 1:}$$

The storage space is the same:

$$(5*60*60*1.5 \text{ Mbps}*3 \text{ courses}+5*60*60*0.2 \text{ Mbps}*3 \text{ courses})/8=11.475 \text{ GB}$$

Thus, the present invention reduces the bandwidth requirement by 50%, from 510 Mbps to 255 Mbps. Note that the space calculation here assumes that no space is wasted due to unavailability of bandwidth on certain disks.

Figure 6:
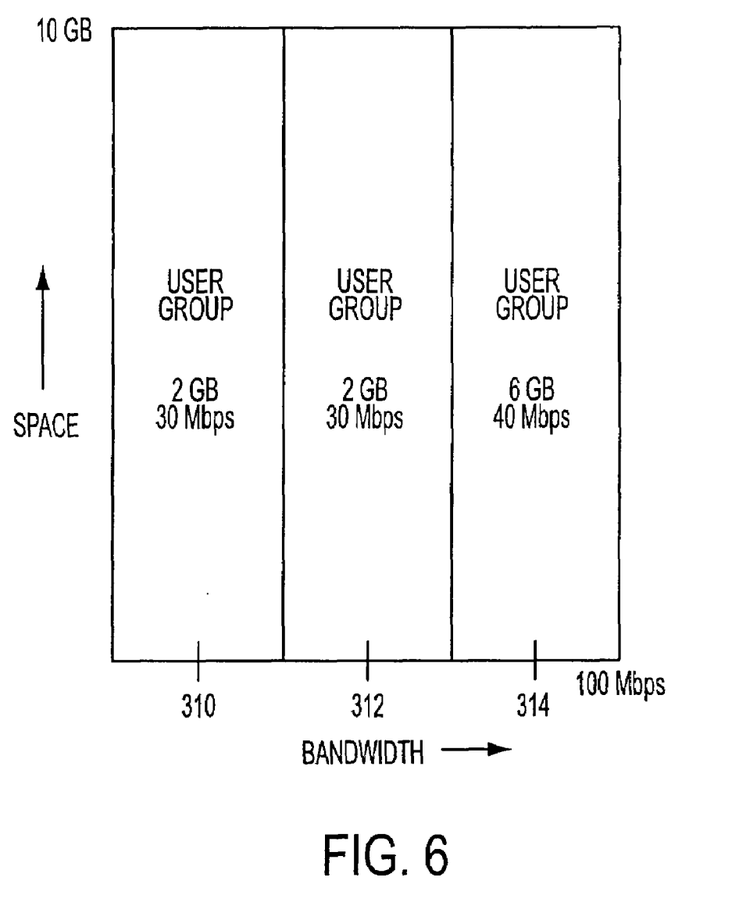
FIG. 6 is an illustration of an embodiment of the present invention as used to partition media assets between groups of users according to an embodiment of the invention.

Directing attention to FIG. 6, an embodiment of the present invention can also be used to partition file system resources between groups of users. In a server having a file system bandwidth of for example 100 Mbps and 10 GB of storage for media assets, asset groups can be used to partition file system resources, with each asset group designated for access to a particular user group. In this example, asset group 310 is assigned to a first user group and has 2 GB of storage and a bandwidth of 30 Mbps, asset group 312 is assigned to a second user group and has 2 GB of storage and a bandwidth of 30 Mbps, and asset group 314 is assigned to a third user group and has 6 GB of storage and a bandwidth of 40 Mbps. Using some primitives, such as authorization, authentication and accounting products, available from Portal Software in Cupertino, Calif., it is possible to provide tracking, billing, monitoring, and other services for all asset groups.

Figure 7:
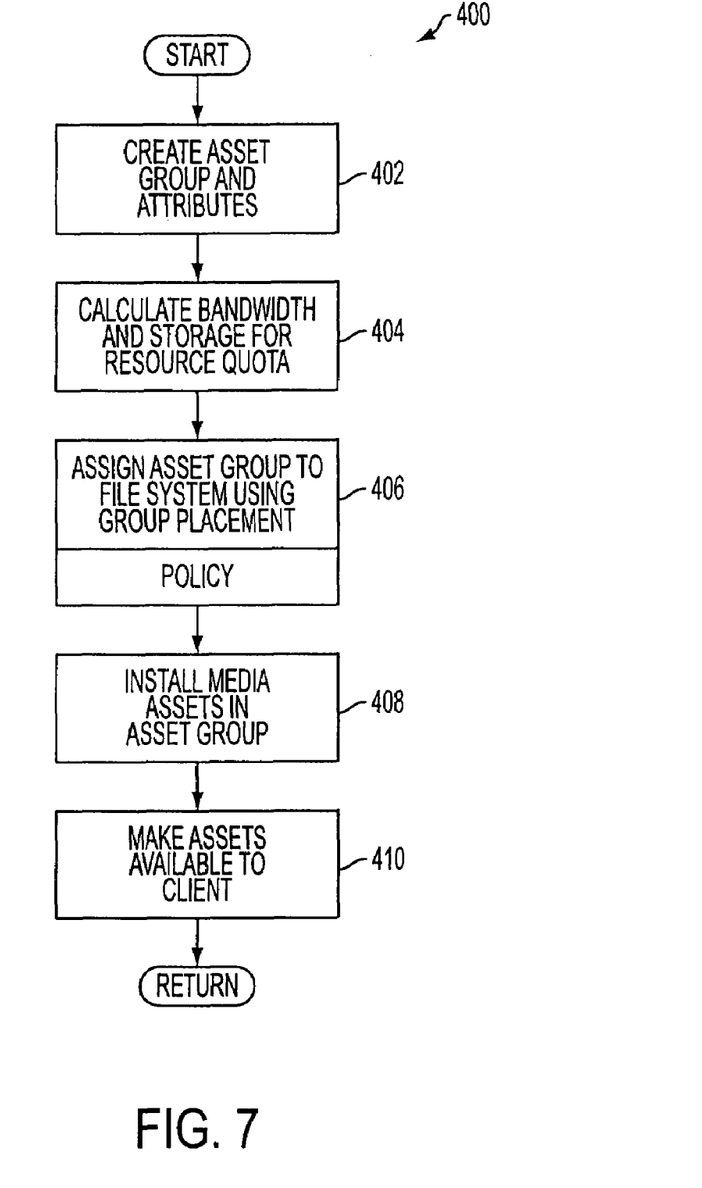
FIG. 7 is a flow chart diagram illustrating the sequence of operations executed to perform a method of an embodiment of the present invention.

Directing attention to FIG. 7, the method 400 of the present invention to create asset group 114 is performed through the following sequence of steps. At step 402, asset group 114 is created, including attributes Maximum Simultaneous Playouts for Asset Group (118), Maximum Bit Rate of the Assets Installed in Asset Group (120), Default Guaranteed Possible Playouts (122), and Resource Quota (126). Creating the asset group 114 can be performed by defining a data structure that contains a list of pointers that contain values indicating the storage locations of the media assets stored in the asset group, as well as pointers to values of the attributes or simply the attribute values themselves rather than pointers. At step 404, the storage bandwidth component of the Resource Quota is calculated by multiplying together the Maximum Simultaneous Playouts for Asset Group (118), Maximum Bit Rate (120), Default Guaranteed Possible Playouts (DGPP) (122). At step 406, the asset group 114 is assigned to a file system 112 maintained on server 102. At step 410, media assets (including media asset 110) are stored in accordance with the asset group 114 and made available to client computer 104.

Having disclosed exemplary embodiments and the best mode, modifications and variations may be made to the disclosed embodiments while remaining within the scope of the present invention as defined by the following claims.

What is claimed is:

1. A server computer for use in a computer network having at least one client computer, the server computer characterized in that the server computer:

sends media assets over said computer network to said client computer, the server computer coupled to at least one file system organized into a plurality of asset groups, each asset group comprising at least one media asset, all media assets within an asset group sharing a quota of system resources including storage medium bandwidth resources and storage medium space resources on the server computer that is reserved for the asset group on a per-asset-group basis rather than on a per-asset basis, and the asset group and the at least one media asset in the asset group being placed within the at least one file system according to (i) an asset group placement policy for placing the asset group which determines the resource quota for the asset group, and (ii) a media asset placement policy for placing the media asset within the placed asset group, which in combination guaranteeing a specified number of simultaneous playouts for each media asset within the asset group; and the file system further characterized in that the asset group is created by:

specifying a maximum simultaneous playouts for asset group attribute, a maximum bit rate of the assets installed in asset group attribute, a guaranteed possible playouts attribute, and a resource quota attribute;

calculating the storage bandwidth component of the resource quota by multiplying together a maximum simultaneous playouts attribute, a maximum bit rate attribute, and a default guaranteed possible playouts attribute (DGPP);

assigning the asset group to the file system maintained on the server;

storing the media asset(s) in accordance with the asset group; and defining a data structure that includes a list of pointers that contain values indicating the storage locations of the media assets stored in the asset group, as well as either pointers to values of the attributes or the attribute values themselves rather than pointers or a combination of the pointers and actual values.

2. The server computer of claim 1, wherein each media asset belongs to only one asset group.

3. The server computer of claim 1, wherein the asset group is limited to a maximum number of simultaneous playouts for the media assets contained within the asset group and further comprises an attribute that designates the number of simultaneous playouts.

4. The server computer of claim 1, wherein the asset group is limited to a maximum bit rate at which any single media asset belonging to the asset group can be played out, further comprising an attribute which indicates the maximum bit rate.

5. The server computer of claim 1, wherein the asset group is associated with a guaranteed possible playouts value that guarantees the number of playouts from each asset belonging to the asset group if no other asset is being played out at the same time, further comprising an attribute which indicates the guaranteed possible playouts value.

6. The server computer of claim 5, further comprising a default guaranteed possible playouts value.

7. The server computer of claim 1, further comprising an asset group policy placement module that places an asset group within the file system.

8. The server computer of claim 7, wherein the asset group policy module distributes the asset group across multiple file systems.

9. The server computer of claim 1, further comprising a media asset placement policy module that places media assets within the asset group.

10. The server computer of claim 9, wherein the media asset placement policy module places media assets within asset groups based on said reserved storage medium bandwidth and storage space.

11. The server computer of claim 9, wherein the media asset placement policy module restricts the placement domain of the media asset to the asset group distribution of storage space and storage bandwidth.

12. The server computer in claim 1, wherein said media asset includes an asset selected from the set consisting of audio, text, graphics, image, symbol, video, information item or token, and combinations thereof.

13. The server computer in claim 1, wherein said media asset comprises an audio, a video, or an audio-video media asset.

14. The server computer in claim 1, wherein said server computer comprises a mass storage subsystem and said file system organized into said plurality of asset groups is defined in said mass storage subsystem.

15. The server computer in claim 14, wherein said mass storage subsystem comprises at least one hard disk drive.

16. The server computer in claim 14, wherein said mass storage subsystem comprises a plurality of hard disk drives.

17. The server computer of claim 1, wherein the asset group placement policy is implemented in an asset group placement policy module that performs asset group placement based on attributes which determine the resource quota for the asset group, and wherein the media asset placement policy is implemented by a media asset placement policy module that performs media asset placement within the placed asset group.

18. The server computer of claim 17, wherein asset groups are placed in a manner that avoids distributing the resource quota across multiple file systems, such as on the same disk array or physical storage device, or within the group storage devices that make up a single file system, in order to better utilize the resource quota, avoid fragmentation of disk resources and avoid asset replication.

19. The server computer of claim 18, wherein asset placement policy module evaluates asset bandwidth to determine the optimal placement for the asset and available resources and use this evaluation to distribute the media assets within the asset groups.

20. The server computer of claim 19, wherein asset placement policy module restricts the placement domain of the media asset to the asset group distribution of storage space and storage bandwidth.

21. The server computer of claim 20, wherein the asset group placement policy module reserves storage space and storage bandwidth for the asset group prior to asset installation on the file system.

22. The server computer of claim 1, wherein the storage medium bandwidth resource component of the system resource quota is calculated by multiplying a value of a maximum simultaneous playouts for asset group attribute by a value of a maximum bit rate attribute.

23. The server computer of claim 22, wherein the quota of storage medium space resources defines the maximum storage space for the asset group in order to preserve the reservation of resources for the asset group and depends on a combination of a maximum bit rate, a duration of playing assets installed within asset group, a Default Guaranteed Possible Playouts (DGPP) value for the asset group, and on an availability of storage space of the file system.

24. The server computer of claim 23, wherein the Default Guaranteed Possible Playouts (DGPP) is an attribute that identifies the guaranteed number of playouts possible from each asset within the asset group assuming no other asset is being played out at the same time, and a storage manager is operative to create enough copies of assets within asset group at an install time to satisfy the value designated by the DGPP.

25. The server computer of claim 22, wherein the Maximum Simultaneous Playouts for Asset Group is an attribute that indicates a maximum simultaneous playouts possible from an asset group, and wherein the system reserves sufficient file system bandwidth at asset group creation time to satisfy this Maximum Simultaneous Playouts for Asset Group attribute value.

26. The server computer of claim 22, wherein the maximum bit rate attribute is an attribute that describes the maximum bit rate of any single asset installed within an asset group.

27. The server computer of claim 1, wherein the quota of storage medium space resources defines the maximum storage space for the asset group in order to preserve the reservation of resources for the asset group and depends on a combination of a maximum bit rate, a duration of playing assets installed within asset group, a Default Guaranteed Possible Playouts (DGPP) value for the asset group, and on an availability of storage space of the file system.

28. A server computer for use in a client-server computer architecture,
the server sending media assets over a computer network to a client computer, the server having a file system organized into a plurality of asset groups, each asset group comprising a plurality of media assets, wherein the plurality of media assets share a quota of system resources including storage medium bandwidth resources and storage medium space resources on the server computer that is reserved for the asset group to which the plurality of media assets belong on a per-asset-group basis rather than on a per-asset basis, and the asset group and the plurality of media assets in the asset group being placed within the file system according to (i) an asset group placement policy for placing the asset group which determines the resource quota for the asset group, and (ii) a media asset placement policy for placing the media asset within the placed asset group, which in combination guaranteeing a specified number of simultaneous playouts for each media asset within the asset group, wherein each media asset belongs to only one asset group;
wherein the file system is further characterized in that the asset group is created by:
specifying a maximum simultaneous playouts for asset group attribute, a maximum bit rate of the assets installed in asset group attribute, a guaranteed possible playouts attribute, and a resource quota attribute;
calculating the storage bandwidth component of the resource quota by multiplying together the maximum simultaneous playouts attribute, the maximum bit rate attribute, and the default guaranteed possible playouts attribute (DGPP);
assigning the asset group to the file system maintained on the server;
storing the media asset(s) in accordance with the asset group; and
defining a data structure that includes a list of pointers that contain values indicating the storage locations of the media assets stored in the asset group, as well as pointers to values of the attributes or the attribute values themselves rather than pointers or a combination of the pointers and actual values.

29. The server computer of claim 28, wherein the asset group is limited to a number of maximum simultaneous playouts for the media assets contained within the asset group and further comprises an attribute that designates the number of simultaneous playouts.

30. The server computer of claim 28, wherein the asset group is limited to a maximum bit rate at which any single media asset belonging to the asset group can be played out, further comprising an attribute which indicates the maximum bit rate.

31. The server computer of claim 28, wherein the asset group is associated with a default guaranteed possible playouts value that guarantees the number of playouts from each asset belonging to the asset group assuming no other asset is being played out at the same time, further comprising an attribute which indicates the guaranteed possible playouts value.

32. The server computer of claim 28, further comprising an asset group policy placement module that places the asset group within the file system.

33. The server computer of claim 32, wherein the asset group policy module distributes the asset group across multiple file systems.

34. The server computer of claim 28, further comprising a media asset placement policy module that places media assets within the asset group based on said reserved storage medium bandwidth and storage space.

35. The server computer of claim 28, wherein the asset group placement policy is implemented in an asset group placement policy module that performs asset group placement based on attributes which determine the resource quota for the asset group, and wherein the media asset placement policy is implemented by a media asset placement policy module that performs media asset placement within the placed asset group.

36. The server computer of claim 35, wherein asset groups are placed in a manner that avoids distributing the resource quota across multiple file systems, such as on the same disk array or physical storage device, or within the group storage devices that make up a single file system, in order to better utilize the resource quota, avoids fragmentation of disk resources and avoids asset replication where possible.

37. The server computer of claim 36, wherein asset placement policy module evaluates asset bandwidth to determine the optimal placement for the asset and available resources and use this evaluation to distribute the media assets within the asset groups.

38. The server computer of claim 37, wherein asset placement policy module restricts the placement domain of the media asset to the asset group distribution of storage space and storage bandwidth.

39. The server computer of claim 38, wherein the asset group placement policy module reserves storage space and storage bandwidth for the asset group prior to asset installation on the file system.

40. The server computer of claim 28, wherein the storage medium bandwidth resource component of the system resource quota is calculated by multiplying the value of the maximum simultaneous playouts for asset group attribute by the value of the maximum bit rate attribute.

41. The server computer of claim 40, wherein the quota of storage medium space resources defines the maximum storage space for the asset group on the file system in order to preserve the reservation of resources for the asset group and depends on a combination of a maximum bit rate, a duration of playing assets installed within asset group, the Default Guaranteed Possible Playouts (DGPP) value for the asset group, and on the availability of storage space of the file system.

42. The server computer of claim 41, wherein the Maximum Simultaneous Playouts for Asset Group is an attribute that indicates the maximum simultaneous playouts possible from an asset group, and wherein the system reserves sufficient file system bandwidth at asset group creation time to satisfy this Maximum Simultaneous Playouts for Asset Group attribute value.

43. The server computer of claim 41, wherein the maximum bit rate attribute is an attribute that describes the maximum bit rate of any single asset installed within an asset group.

44. The server computer of claim 28, wherein the quota of storage medium space resources defines the maximum storage space for the asset group in order to preserve the reservation of resources for the asset group and depends on a maximum bit rate, a duration of playing assets installed within asset group, the Default Guaranteed Possible Playouts (DGPP) value for the asset group, and on the availability of storage space of the file system.

45. The server computer of claim 44, wherein the Default Guaranteed Possible Playouts (DGPP) is an attribute that identifies the guaranteed number of playouts possible from each asset within the asset group assuming no other asset is being played out at the same time, and a storage manager is operative to create enough copies of assets within an asset group at an install time to satisfy the value designated by the DGPP.

46. A server computer for use in a client server computer architecture,
the server sending media assets over a computer network to a client computer, the server having at least one file system organized into a plurality of asset groups, each asset group comprising a plurality of media assets, wherein the plurality of media assets share a quota of system resources including storage medium bandwidth resources and storage medium space resources on the server computer that is reserved for the asset group to which the plurality of media assets belong on a per-asset-group basis rather than on a per-asset basis, and the asset group and the plurality of media assets in the asset group being placed within the at least one file system according to (i) an asset group placement policy for placing the asset group which determines the resource quota for the asset group, and (ii) a media asset placement policy for placing the media asset within the placed asset group,
wherein each media asset belongs to only one asset group, wherein each asset group is limited to a number of maximum simultaneous playouts for the media assets contained within the asset group and further comprises an attribute that designates the number of simultaneous playouts for each media asset within the asset group, wherein each asset group is limited to a maximum bit rate at which any single media asset belonging to the asset group can be played out, further comprising an attribute which indicates the maximum bit rate, wherein each asset group is associated with a default guaranteed possible playouts value that guarantees the number of playouts from each asset belonging to the asset group assuming no other asset is being played out at the same time, further comprising an attribute which indicates the guaranteed possible playouts value; and
wherein the file system is further characterized in that the asset group is created by:
specifying a maximum simultaneous playouts for asset group attribute, a maximum bit rate of the assets installed in asset group attribute, a guaranteed possible playouts attribute, and a resource quota attribute;
calculating the storage bandwidth component of the resource quota by multiplying together the maximum simultaneous playouts attribute, the maximum bit rate attribute, and the default guaranteed possible playouts attribute (DGPP);
assigning the asset group to the file system maintained on the server;
storing the media asset(s) in accordance with the asset group; and defining a data structure that includes a list of pointers that contain values indicating the storage locations of the media assets stored in the asset group, as well as pointers to values of the attributes or the attribute values themselves rather than pointers or a combination of the pointers and actual values.

* * * * *